(12) United States Patent
Hessert et al.

(10) Patent No.: US 8,823,312 B2
(45) Date of Patent: Sep. 2, 2014

(54) ELECTRIC MOTOR ASSEMBLY, METHOD FOR OPERATING AN ELECTRIC MOTOR, AND MOTOR CONTROL DEVICE

(75) Inventors: Henrik Hessert, Wörth (DE); Guenther Riehl, Buehl (DE); Christian King, Turin (IT); Christian Poddey, Oetigheim (DE); Thomas Helming, Baden-Baden (DE)

(73) Assignee: Robert Bosch GmbH, Stuttgart (DE)

( * ) Notice: Subject to any disclaimer, the term of this patent is extended or adjusted under 35 U.S.C. 154(b) by 708 days.

(21) Appl. No.: 13/060,018

(22) PCT Filed: Jun. 12, 2009

(86) PCT No.: PCT/EP2009/057259
§ 371 (c)(1),
(2), (4) Date: Jul. 14, 2011

(87) PCT Pub. No.: WO2010/020444
PCT Pub. Date: Feb. 25, 2010

(65) Prior Publication Data
US 2011/0260670 A1 Oct. 27, 2011

(30) Foreign Application Priority Data
Aug. 19, 2008 (DE) .......................... 10 2008 041 325

(51) Int. Cl.
*H02P 25/00* (2006.01)
*H02P 6/00* (2006.01)
*H02P 7/285* (2006.01)

(52) U.S. Cl.
USPC ................. 318/700; 318/400.01; 318/400.29; 388/813

(58) Field of Classification Search
USPC ................. 318/400.01, 400.29, 700; 388/813
See application file for complete search history.

(56) References Cited

U.S. PATENT DOCUMENTS

| 7,095,952 B2 * | 8/2006 | Lelkes | 318/400.01 |
| 2002/0033686 A1 | 3/2002 | Uhl | |
| 2005/0141887 A1 * | 6/2005 | Lelkes | 388/813 |
| 2008/0093458 A1 * | 4/2008 | Pearce et al. | 235/462.32 |

FOREIGN PATENT DOCUMENTS

| CN | 1715851 | 1/2006 |
| DE | 3910643 A1 | 10/1990 |
| DE | 10035829 A1 | 4/2001 |
| DE | 10062940 A1 | 6/2002 |
| JP | 2003223029 | 8/2003 |
| JP | 2004215362 | 7/2004 |

OTHER PUBLICATIONS

PCT/EP2009/057259 International Search Report.

* cited by examiner

*Primary Examiner* — Bentsu Ro
*Assistant Examiner* — Gabriel Agared
(74) *Attorney, Agent, or Firm* — Michael Best & Friedrich LLP

(57) ABSTRACT

The invention relates to an electric motor assembly, particularly for driving a fan for an engine cooling system and/or an air conditioner of a motor vehicle, comprising an electric motor and a motor control device for activating the electric motor. According to the invention, the motor control device can be adjusted according to a characteristic curve (1,2,3,4) of the electric motor and/or of the fan, and thereby the power and/or rotational speed of the electric motor can be adjusted.

16 Claims, 1 Drawing Sheet

ELECTRIC MOTOR ASSEMBLY, METHOD FOR OPERATING AN ELECTRIC MOTOR, AND MOTOR CONTROL DEVICE

BACKGROUND OF THE INVENTION

The invention relates to an electric motor assembly, particularly for driving a fan for an engine cooling system and/or an air conditioning system of a motor vehicle, comprising an electric motor and a motor control device for activating the electric motor. The invention also comprises a method for operating an electric motor and a motor control device.

Electric motor assemblies of the type stated at the beginning are known. They are often used for driving a fan of a motor vehicle, this fan being assigned for example to the engine cooling system and/or the air conditioning system. To set the power of the fan, a motor control device, particularly a clock controller, is used to activate the electric motor. The clock controller is activated, for example as prescribed by a closed-loop or open-loop control device of an internal combustion engine, in such a way that the electric motor of the fan is operated in a specific clock ratio. This allows virtually any desired activation of the electric motor in its entire power range. Electric motors have tolerances, which are problematic when designing a device, for example the engine cooling system or the air conditioning system, since it is only with difficulty that allowance can be made for them. The tolerances may, for example, concern power consumption, power output and/or efficiency of the motors. If these tolerances are to be restricted, for example by high-precision production and/or rejecting motors that lie outside a tolerance range, comparatively high costs are incurred. Therefore, for reasons of cost, a relatively great tolerance is usually accepted with respect to the electrical power consumption, power output and/or efficiency of electric motors. Allowance must be made for this when designing the device. This means that, with the electric motor that has the lowest power output, a required minimum power, for example air flow rate, must be achieved in the device. The electric motor with the greatest power output in this case produces excess power, for example in the sense of an excess of air, but must similarly still be able to be used. Therefore, the electric motor with the lowest power output is determinative for the design of the power that is output. The requirements must, however, be satisfied by all the electric motors in the authorized tolerance range. This requires that wearing parts of the electric motor, for example the carbon brushes, are designed for the electric motor with the greatest power output, since the greatest effects of wear occur in the case of this motor under full load. Since the design is made to suit the motor with the greatest power output, it is overdimensioned for most intended uses.

SUMMARY OF THE INVENTION

In comparison, the electric motor assembly of the invention has the advantage that, in spite of the relatively great tolerances that the electric motors have, overdimensioning of the electric motor is avoided in the design of the device. Consequently, low-cost components can be used. This is achieved according to the invention by it being possible for the motor control device to be set according to a characteristic curve of the electric motor and/or the fan and the electric motor thus being adaptable in its power and/or rotational speed. The characteristic curve of the electric motor is determined for example after the electric motor has been produced and/or before it is installed. The motor control device is set according to the characteristic curve, in order to achieve an adaptation of the power and/or rotational speed of the electric motor. The tolerance range described above extends from the electric motor with the lowest power output and/or rotational speed to the electric motor with the greatest power output and/or rotational speed, for which the greatest effects of wear occur. It is therefore advantageous to adapt the power and/or rotational speed of the electric motor with the greatest power output in such a way that the requirements for power output and/or rotational speed are satisfied, but the effects of wear are minimized. Therefore, an electric motor which can produce the required air flow rate or the required power output even with the lowest permissible power output and/or rotational speed is preferably used for the device to be designed, while electric motors which have greater power output and/or rotational speed are adapted, in particular limited, in their power and/or rotational speed by means of the motor control device on the basis of the characteristic curve of the electric motor. This means that the choice of electric motor for the device to be designed must be made merely on the basis of one characteristic variable, to be specific the lowest power output and/or lowest rotational speed. Only little allowance has to be made for a reduced lifetime of electric motors that can output a higher level of power and/or have a higher rotational speed, since the electric motors are limited to a lower power and/or rotational speed. In this way, either the lifetime of the device can be increased or a simpler, and therefore less expensive, electric motor can be fitted. If the electric motor is used in a fan, the amount of air delivered is thus dependent on the rotational speed of the electric motor. A higher rotational speed than that required therefore entails an unnecessarily high delivery rate and reduces the lifetime of the electric motor. In the case of the fan, it is often so that only the desired amount of air is prescribed. It is then preferably the rotational speed that is limited. It may also be that a characteristic curve of the fan and not of the electric motor is used for adapting the power and/or the rotational speed. In this case, allowance can also be made for tolerances of the device, that is to say in particular the fan. For example, the characteristic curve may describe the amount of air delivered against the rotational speed, and the power or the rotational speed of the fan is set to a required delivery rate. The adaptation of the power and/or rotational speed should be understood in this context as adaptation of the maximum power and/or the maximum rotational speed of the electric motor. Therefore, a limitation of the maximum power and/or maximum rotational speed is provided.

A development of the invention provides that the characteristic curve is determined after the electric motor has been produced and/or installed, in particular by an end-of-line test. The determination of the characteristic curve is performed in a suitable way, for example on a test bed. It is particularly advantageous to determine the characteristic curve in an end-of-line test, which in many cases is performed in any case after the electric motor has been produced and/or installed, for example in order to check that it is in working order.

A development of the invention provides that the motor control device is a clock controller or has a clock controller. The clock controller consists, for example, of an interface with respect to a motor control unit, electronics with a computer and transistors for the clocked activation of the electric motor. It is intended to use the clock controller as a means for obtaining a motor power that is the same for the electric motors. This happens by adapting the on/off ratio of the transistors to the tolerance position of the electric motor or to the characteristic curve, so that overdimensioning of the electric motor is avoided. In this case, the motor control device may be a clock controller. Alternatively, it is provided that the motor control device includes a clock controller.

A development of the invention provides that the characteristic curve is a power characteristic curve and/or rotational speed characteristic curve. In principle, an assessment of the tolerance position of the electric motor may be based on any desired characteristic curve. However, it is advantageously provided that a power characteristic curve and/or a rotational speed characteristic curve is/are used. In the power characteristic curve, the power of the electric motor or a torque is recorded against a further value, for example a rotational speed. On the basis of the power characteristic curve, it is particularly easy to set the motor control device such that the electric motor has the desired power.

A development of the invention provides that the setting of the motor control device is performed, in particular on a single occasion, before regular operation of the electric motor. The electric motor is therefore adapted before regular operation, that is to say operation for checking and/or testing purposes can take place even without setting the motor control device. The setting of the motor control device is preferably performed before or after, in particular directly before or after, installation in the device to be designed is carried out. If the setting takes place on just a single occasion, it is therefore particularly advantageous if the setting is carried out in such a way as to make allowance for possible changes in the power of the electric motor, for example over its entire lifetime. If the setting is performed after installation, this has the advantage that allowance can also be made for any tolerances there may be of the device to be designed.

A development of the invention provides that the motor control device is set such that the characteristic curve or the power and/or rotational speed substantially coincide(s) with at least one characteristic curve or at least one power and/or rotational speed of further electric motors of the same type. As described above, in the production of electric motors there is sometimes a wide tolerance band, unless cost-intensive measures are taken to reduce it. Therefore, the motor control device is used as a means for making the characteristic curve or the power and/or rotational speed of the electric motor match the characteristic curve or the power and/or rotational speed of further electric motors of the same type, that is to say for example electric motors of the same production series. In this way, a large number of electric motors with a power and/or rotational speed extending over a wide tolerance range can be fitted, and nevertheless a substantially identical power and/or rotational speed of the electric motors ensured.

A development of the invention provides that the power and/or rotational speed can be fixed by means of a proportionality factor, determined in particular on the basis of the characteristic curve. In order not to have to keep the complete characteristic curve in the motor control device, it is provided that only a proportionality factor is fixed. For example, a percentage of the maximum power of the electric motor with which the desired power output is achieved may be specified. If a clock controller is used, the proportionality factor may, for example, specify the on time of transistors. It may be provided, for example, that, when there is a maximum power demand, the motor that has the lowest power output and/or rotational speed is activated with 100% on time of the transistors, while the electric motor with the greatest power output and/or rotational speed has an on time of only 87%. The proportionality factor is advantageously determined from the characteristic curve. That is to say that the characteristic curve of the motor is established and the proportionality factor is subsequently derived from the characteristic curve.

A development of the invention provides that the electric motor is provided with a marking, by means of which the characteristic curve and/or the proportionality factor can be assigned to it. It is therefore provided that the electric motor is assigned the specific characteristic curve and/or the specific proportionality factor in such a way that it can easily be read out. For this purpose, the electric motor is provided with a marking In this case, the characteristic curve and/or the proportionality factor may be coded in the marking, or else the marking may represent an identification by means of which the characteristic curve and/or the proportionality factor can be assigned. In the latter case, the marking is, for example, a serial number, the characteristic curve and/or the proportionality factor being linked with the serial number in a central register, for example a database. However, the first-mentioned possibility, that is that the characteristic curve and/or the proportionality factor is/are contained directly in the marking, is advantageously used.

A development of the invention provides that the marking is a barcode. The barcode may be applied to the electric motor in a simple manner. It is therefore easily possible to assign to it a clear identification and/or a data record in which the characteristic curve and/or the proportionality factor and/or the serial number is/are coded.

A development of the invention provides that the electric motor has a greater power and/or rotational speed than that required and is adapted to the required power and/or rotational speed by means of the motor control device. For example, a production series of electric motors may be chosen such that all the electric motors satisfy the requirements for a minimum power output and/or rotational speed. In this case, due to the tolerance of the power and/or rotational speed, the power that is output and/or the rotational speed that is delivered of a number of the electric motors is/are too great. It is provided here that these electric motors should be adapted by means of the motor control device in such a way that they only deliver the required power and/or rotational speed. As described above, in this way the lifetime of the electric motor is increased, for example, or else the use of electric motors of a simpler type series, which is therefore less expensive, is made possible.

The invention also relates to a method for operating an electric motor, in particular according to the statements made above, the power and/or rotational speed of the electric motor being adaptable by means of a motor control device, particularly a clock controller, with the steps of: determining a characteristic curve of the electric motor and/or a device that can be driven by means of the electric motor after production, assigning the characteristic curve and/or a proportionality factor, determined in particular from the characteristic curve, to the electric motor by a marking of the electric motor, adapting the motor control device according to the characteristic curve and/or proportionality factor that is assigned to the electric motor by the marking, and operating the electric motor with the power and/or rotational speed adapted by means of the motor control device. With regard to the individual steps, reference is made to the statements made above with respect to the electric motor assembly.

The invention also relates to a motor control device, particularly a clock controller, for activating an electric motor, in particular according to the statements made above, and/or for implementing the method described above. In this respect it is provided that the motor control device can be set according to a characteristic curve of the electric motor and/or a device that can be driven by means of the electric motor, and the electric motor can thus be adapted in its power and/or rotational speed. The motor control device may be assigned in particular to the electric motor assembly described above.

BRIEF DESCRIPTION OF THE DRAWINGS

The invention is explained in more detail below on the basis of the exemplary embodiments that are represented in the drawing, without thereby restricting the invention. In the drawing.

DETAILED DESCRIPTION

Figure 1:
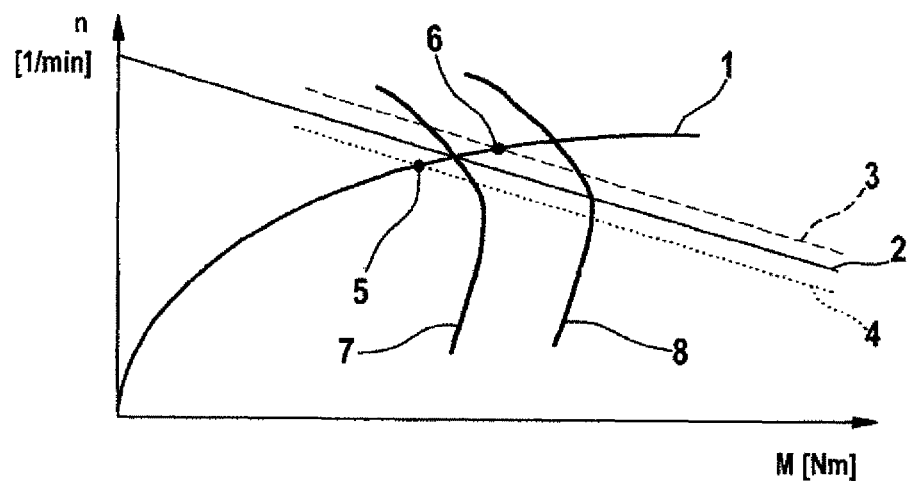
FIG. 1 shows a diagram in which a rotational speed is plotted against a torque, a characteristic curve of a device to be designed being represented, as well as characteristic curves of electric motors of an electric motor assembly with a tolerance range.

FIG. 1 shows a diagram in which a rotational speed n of the unit (1/min) is plotted against a torque M of the unit [Nm]. A characteristic curve 1 of the device to be designed (not shown) is represented. Also represented are characteristic curves 2, 3 and 4 of a series of electric motors. In this case, the characteristic curve 2 describes the variation, averaged over the series, in the rotational speed n against the torque M. The characteristic curve 3 describes an electric motor which delivers the greatest power output at a set operating point, while the characteristic curve 4 represents the electric motor with the lowest power output. In the design of the device, it must always be ensured that the lowest power output of the electric motors (that is to say the variation represented in the characteristic curve 4) is greater than the lowest permissible power output that is determined by the device. On the other hand, it must be taken into account that an electric motor described by the characteristic curve 3, that is to say the electric motor with the greatest power output at the specific operating point, has greater effects of wear than the electric motor with the lowest power output. An operating point 5, which lies at the point of intersection of the characteristic curve 1 with the characteristic curve 4, is the operating point at which the electric motor with the lowest power output is operated. On the other hand, the operating point 6, which lies at the point of intersection of the characteristic curve 1 with the characteristic curve 3, describes the operating point of the electric motor with the highest power output. It is clear that the operating point 6 has both a higher rotational speed n and a higher torque M than the operating point 5. This is the reason for the greater wear of the electric motor with the greatest power output. However, as described above, the device is designed in such a way that the electric motor with the lowest power output is adequate. Consequently, the higher rotational speed n or the higher torque M of the operating point 6, that is to say the additional power output in comparison with the operating point 5, is surplus to requirements, and is actually not needed by the device to be designed but merely leads to the greater wear described, and consequently to a shorter life expectancy of the electric motor. Therefore, usually a higher-rated design of the electric motor must be chosen in order to fulfil both the requirements for the lowest permissible power output and the lifetime of the electric motor. This is costly however. The higher-rated design of the electric motors possibly also means that there is an increased space requirement, which is likewise a negative factor. The situation described is depicted in the diagram by operative range characteristic curves 7 and 8. These operative range characteristic curves 7 and 8 indicate the maximum rotational speed n and the maximum torque M, that is to say the maximum permissible power at which a required lifetime of the electric motor or the electric motors is achieved. The operative range characteristic curve 7 denotes a normal design of the electric motor and the operative range characteristic curve 8 denotes a higher-rated design. It is clearly evident that the operating point 5 of the electric motor with the lowest power output lies to the left of the operative range characteristic curve 7. Therefore, the normal design of the electric motor can be used without premature failure having to be feared. By contrast, the operating point 6 of the electric motor with the greatest power output lies on the right side of the operative range characteristic curve 7, so that failure of the electric motor appears likely. For this reason, the higher-rated design of the electric motor with the operative range characteristic curve 8 must be used. Here, both the operating point 5 and the operating point 6 lie to the left of the operative range characteristic curve 8. As described above, this causes additional costs and possibly results in a greater weight and/or a larger overall volume of the electric motor.

Figure 2:
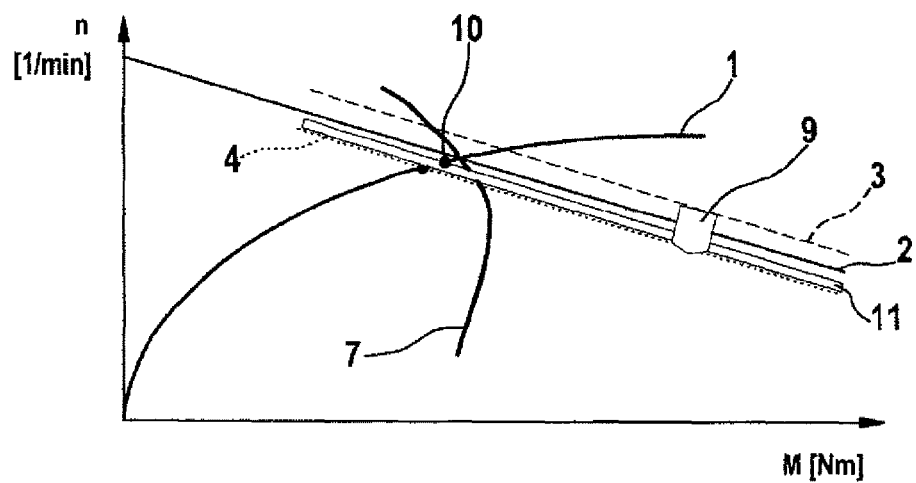
FIG. 2 shows the diagram from FIG. 1, the tolerance range being reduced by shifting a characteristic curve of the electric motor.

FIG. 2 shows the diagram familiar from FIG. 1, an electric motor assembly according to the invention being used; therefore, the electric motor is adaptable in its power. The electric motor assembly includes a motor control device, with which the electric motor is activated. By means of the motor control device, a characteristic curve of the electric motor can be set and the electric motor thus adapted in its power. As can be seen in the diagram of FIG. 1, the motor control device of the electric motor assembly is used to adapt the electric motor with the greatest power output in its power in such a way that continuous operation is possible. The characteristic curve 3 is consequently shifted in the direction of the arrow 9 such that a new operating point 10, which lies at a point of intersection of the characteristic curve 1 with the characteristic curve 11, created by the adaptation of the power of the electric motor, is positioned to the left of the operative range characteristic curve 7. The new characteristic curve 11 is virtually congruent with the characteristic curve 4 of the electric motor with the lowest power output. Consequently, using the normal design of the electric motor (operative range characteristic curve 7), continuous running endurance can be achieved with all electric motors, that is to say from the electric motor with the lowest power output to the electric motor with the greatest power output. This makes it possible to save not only the costs for the higher-rated design of the electric motor but also weight and additional installation space.

A further advantage of the adaptation of the electric motor assembly is the possible realization of a modular system. While the present procedure (corresponding to FIG. 1) is that a one-off design of the electric motor, and as a result a one-off design of the motor control device, is devised for each project, when the characteristic curve of the electric motor is set by means of the motor control device a modular system can be used for the electric motor and a motor control device. Thus, for example, a suitable choice is made from three motor classes. In this case, a slight overdimensioning of the electric motor or the electric motor assembly for some applications can be accepted, since this can be adapted by setting the motor control device to an optimum operating state. In this way, the complexity in development, sales and production can be significantly reduced. For example, both an electric motor and a motor control device can be chosen from the modular system. In the final assembly of the device to be designed, these components are put together with project-specific components, for example fans and frames. Only by adapting the motor control device to power requirements that are typical of the project and specific to the electric motor by means of a set of parameters is the device adapted for the application or to the device. This may involve, for example, setting a required rate of air of a fan by adapting the rotational speed. This has the advantage that allowance can also be made for tolerances of the device, not only of the electric motor. With the procedure known from the prior art, specific components, for example the frame and fan but also the electric motor and the motor control device, are fixed during the design of a device for each project. In this case, the electric motor and the motor control device form a functionally matched unit and must be designed on the development side in such a way that allowance is made for all tolerances. This usually requires repeated iterations and is correspondingly complex.

The advantages of the electric motor assembly according to the invention, the method according to the invention for operating an electric motor and the motor control device according to the invention are therefore the low-cost design of the electric motors, the possible use of an electric motor assembly or an electric motor and/or a motor control device for various applications, the possible realization of a modular system for the motor control device and the electric motor, a significant reduction in the variety of electric motors and motor control devices, a reduction in complexity for sales and development and the evolvement of additional sensor technology, by means of which for example power adaptation can be realized.

The invention claimed is:

1. A method for operating an electric motor assembly for driving a fan, the electric motor assembly comprising an electric motor, and a motor control device for controlling the electric motor, wherein the motor control device can be set according to a characteristic curve (2, 3, 4) of the electric motor and of a characteristic (1) of the fan, and at least one of a power and a rotational speed of the electric motor is thereby adaptable, and the motor control device is set such that the characteristic curve (2, 3, 4) and at least one of the power and the rotational speed substantially matches at least one characteristic curve (2, 3, 4) and/or at least one of a power and a rotational speed of additional electric motors of the same type, the method including the steps of:
    determining a characteristic curve (2, 3, 4) of the electric motor and of a characteristic curve (1) of a device that can be driven by the electric motor after production,
    assigning the characteristic curve (1, 2, 3, 4) and/or a proportionality factor, determined from the characteristic curve (1, 2, 3, 4), to the electric motor by a marking of the electric motor,
    adapting the motor control device according to the characteristic curve (1, 2, 3, 4) and/or the proportionality factor that is assigned to the electric motor by the marking, and
    operating the electric motor with the power and/or rotational speed adapted by the motor control device, characterized in that
    the motor control device is set such that the characteristic curve (2, 3, 4) and the power and/or rotational speed substantially matches at least one characteristic curve (2, 3, 4) and/or at least one power and/or rotational speed of additional electric motors of the same type.

2. A motor control device for carrying out the method of claim 1, characterized in that the characteristic curve (2, 3, 4) of the electric motor is shifted on a rotation-speed/torque graph taking into account of an operating range characteristic curve (7), which corresponds to a normal design of the electric motors of the same type within the electric motor assembly, such that a new operating point, which is located in an area defined by the operating range characteristic curve (7), is set via an intersection point (10) of the characteristic curve (2, 3, 4) of the electric motor with the characteristic curve (1) of the fan or of the device which can be driven.

3. An electric motor assembly for driving a fan, the electric motor assembly comprising:
    an electric motor; and
    a motor control device for controlling the electric motor, characterized in that
    the motor control device can be set according to a characteristic curve (2, 3, 4) of the electric motor and of a characteristic (1) of the fan, and at least one of a power and a rotational speed of the electric motor is thereby adaptable,
    the motor control device is set such that the characteristic curve (2, 3, 4) and at least one of the power and the rotational speed substantially matches at least one characteristic curve (2, 3, 4) and/or at least one of a power and a rotational speed of additional electric motors of the same type, and
    the characteristic curve (2, 3, 4) of the electric motor is shifted on a rotation-speed/torque graph taking into account of an operating range characteristic curve (7), which corresponds to a normal design of the electric motors of the same type within the electric motor assembly, such that a new operating point, which is located in an area defined by the operating range characteristic curve (7), is set via an intersection point (10) of the characteristic curve (2, 3, 4) of the electric motor with the characteristic curve (1) of the fan or of the device which can be driven.

4. The electric motor assembly as claimed in claim 3, characterized in that the characteristic curve (2, 3, 4) is determined after the electric motor has been produced and/or installed.

5. The electric motor assembly as claimed in claim 4, characterized in that the characteristic curve (2, 3, 4) is determined by a belt end test.

6. The electric motor assembly as claimed in claim 3, characterized in that the motor control device includes a clock controller.

7. The electric motor assembly as claimed in claim 3, characterized in that the setting of the motor control device is performed before regular operation of the electric motor.

8. The electric motor assembly as claimed in claim 3, characterized in that at least one of the power and the rotational speed can be fixed by means of a proportionality factor, determined on the basis of the characteristic curve (2, 3, 4).

9. The electric motor assembly as claimed in claim 8, characterized in that the electric motor is provided with a marking, by means of which the proportionality factor can be assigned to it.

10. The electric motor assembly as claimed in claim 3, characterized in that the electric motor is provided with a marking, by which the characteristic curve (2, 3, 4) can be assigned to it.

11. The electric motor assembly as claimed in claim 10, characterized in that the marking is a barcode.

12. The electric motor assembly as claimed in claim 3, characterized in that the electric motor has at least one of a greater power and a greater rotational speed than that required and is adapted to the required power or rotational speed by the motor control device.

13. The electric motor assembly as claimed in claim 3, characterized in that the characteristic curve (2, 3, 4) is a power characteristic curve.

14. The electric motor assembly as claimed in claim 3, characterized in that the characteristic curve (2, 3, 4) is a rotational speed characteristic curve.

15. The electric motor assembly as claimed in claim 3, characterized in that the rotational speed can be fixed by means of a proportionality factor, determined on the basis of the characteristic curve (2, 3, 4).

16. The electric motor assembly as claimed in claim 3, characterized in that the electric motor has a greater rotational speed than that required and is adapted to the required rotational speed by means of the motor control device.

* * * * *